Nov. 25, 1958 S. LENET ET AL 2,861,798
VEHICLE SPRING
Filed March 28, 1955
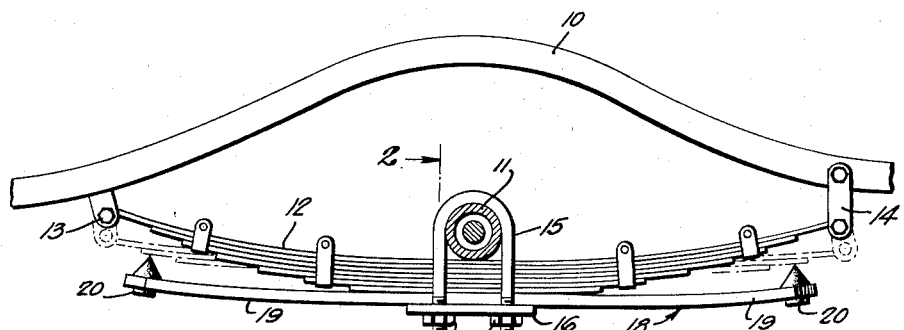
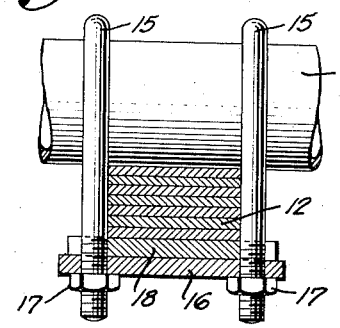
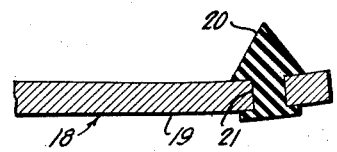
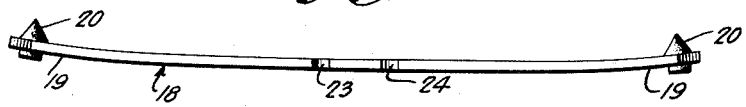
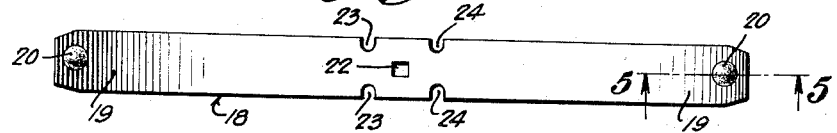
INVENTORS
SIDNEY LENET
JACK LENET
BY *Bill Cohen*
ATTORNEY

United States Patent Office 2,861,798
Patented Nov. 25, 1958

2,861,798

VEHICLE SPRING

Sidney Lenet and Jack Lenet, Philadelphia, Pa.

Application March 28, 1955, Serial No. 497,156

2 Claims. (Cl. 267—45)

The present invention relates generally to spring suspension means for vehicles and more particularly to so-called helper or overload springs which enable a vehicle having more or less conventional leaf springs to carry heavier loads than originally intended.

Multiple leaf springs are commonly employed as a suspension means for the body of a vehicle on its axle. These springs are designed to suspend leads within normal ranges but are unsatisfactory under overload conditions. Numerous attempts have been made to provide so-called helper or overload springs as an auxiliary spring to the conventional vehicle spring to reinforce the latter under overload conditions but in most cases these auxiliary springs are either complicated or are difficult to install.

A primary object of the present invention is to provide an auxiliary leaf spring of relatively simple construction, inexpensive to manufacture and easily applied to a standard vehicle without special parts or modification of the standard spring structure.

A further object of the invention is to arrange the auxiliary spring to function only during an overload condition, said auxiliary spring being disassociated from the standard spring during normal load conditions.

Other objects and advantages of the present invention will appear from the following description taken in connection with the accompanying drawing wherein:

Figure 1 is a fragmentary side elevational view of a vehicle suspension, showing the improved auxiliary spring installation.

Figure 2 is an enlarged sectional view taken on the line 2—2 of Figure 1.

Figure 3 is a side elevational view of the auxiliary spring.

Figure 4 is a bottom plan view of the spring shown in Figure 3.

Figure 5 is an enlarged sectional view taken on the line 5—5 of Figure 4.

Figure 6 is a side view of a slightly modified form of auxiliary spring.

Referring to the drawing in detail, there is shown a portion of a vehicle frame 10, which is suspended over an axle 11 by a multiple leaf spring 12. The forward end of the spring 12 is pivotally supported to the frame at 13 and the opposite end of the spring is supported to the frame by a swinging shackle 14. The axle 11 is secured to the center of the spring by U bolts 15, the ends of which are threaded and extend through the plate 16. The nuts 17 are applied to the ends of the U bolts to complete the assembly.

The auxiliary spring is shown generally at 18 and comprises a strip of steel substantially equal in length to the length of the spring 12 and having a width slightly wider than the width of the spring 12.

The spring in its unstressed position is generally straight as viewed in side elevation except that the ends are curved slightly upwardly as indicated at 19. Each end is provided with a pad 20 extending through an opening 21 as seen in Figure 5. The pads 20 are formed of resilient rubber or like material, and serving under overload conditions to engage and support the end portions of the main spring 12 as seen in dotted lines in Figure 1. The pads are so mounted in the auxiliary spring 18 as to be readily replaceable when worn.

In standard spring constructions, a bolt and nut are used to hold the multiple leaves of the spring 12 together and the opening 22 in the leaf spring 18 is provided to fit over said nut, not shown. Oppositely disposed notches 23 and 24 are formed in the auxiliary spring 18 to receive the legs of the U bolts 15. These notches prevent slippage of the auxiliary spring 18 and due to the increased width of said auxiliary spring, the provision of notches does not materially affect the strength of the spring. The additional width of the spring will add additional support and with the notches, can be used with the standard U bolts.

If it is desired to increase the rigidity of the auxiliary spring 18, an additional leaf may be secured to the main leaf. This is shown in the modified construction shown in Figure 6 wherein the auxiliary spring 18' is similar in all respects to the spring 18 but has added thereto a shortened leaf spring 25 secured to the auxiliary spring 18' by any suitable means such as clips 26.

When the auxiliary spring is applied to a standard multiple leaf spring such as shown at 12, the plate 16 is removed by removing the nuts 17 and the auxiliary spring 18 is placed beneath the spring 12. The plate 16 is then replaced and the nuts 17 applied to the ends of the U bolts 15, thus resulting in a very simple installation without modifying any of the parts of the standard construction.

Under normal conditions the auxiliary spring is in the position shown in full lines in Figure 1 and is supporting no weight of the vehicle. When the vehicle is overloaded, the spring 12 is flexed to a point where the lower surface of the spring 12 strikes the pads 20 as shown in dotted lines in Figure 1, thereby transferring part of the load to the auxiliary spring 18. Thus, under normal load conditions, the auxiliary spring 18 is inoperative and will not interfere with the riding comfort of the standard spring suspension.

While the invention has been illustrated and described in its preferred form, it will be understood that minor changes in the size, shape and arrangement of parts may be made without departing from the spirit of the invention except as may be required by the scope of the following claims. For example, instead of curving the ends of the spring as shown at 19, the auxiliary spring can be straight in its entirety. The auxiliary spring 18 has been described as being of substantially the same length as spring 12. It will be clear that this includes an auxiliary spring slightly less in length than spring 12 as shown in the drawings.

Having thus described the invention, what is claimed is:

1. In vehicle spring equipment for application to a vehicle spring of the half elliptical leaf type, where the vehicle spring has its ends attached to the frame of a vehicle and has its medial portion attached to an axle of the vehicle by means of U bolts, an auxiliary spring of a length substantially equal to the vehicle spring and of a width slightly greater than the width of the vehicle spring, resilient pads mounted at the ends of the auxiliary spring, and notches formed in the side edges of the auxiliary spring to accommodate the legs of the U bolts.

2. A device as claimed in claim 1, said auxiliary spring including a leaf spring secured thereto, said leaf spring being of the same width as the auxiliary spring.

References Cited in the file of this patent

UNITED STATES PATENTS

| | | |
|---|---|---|
| 1,482,674 | Busse | Feb. 5, 1924 |
| 1,601,110 | Crouch | Sept. 28, 1926 |
| 2,188,689 | Marco | Jan. 30, 1940 |
| 2,580,975 | Tea | Jan. 1, 1952 |

FOREIGN PATENTS

| | | |
|---|---|---|
| 572,385 | France | Feb. 20, 1924 |